United States Patent
Bengala et al.

[11] Patent Number: 6,061,645
[45] Date of Patent: May 9, 2000

[54] PROCESS AND APPARATUS FOR MEASURING THE VOLUME OF AN OBJECT

[75] Inventors: Moreno Bengala; Alessandro Golfarelli; Stefano Amorosi; Guglielmo Piazzi, all of Bologna, Italy

[73] Assignee: Datalogic S.p.A., Bologna, Italy

[21] Appl. No.: 09/000,794

[22] Filed: Dec. 30, 1997

[30] Foreign Application Priority Data

Dec. 31, 1996 [EP] European Pat. Off. ............. 96830665

[51] Int. Cl.[7] .................................................. G01B 11/00
[52] U.S. Cl. ...................... 702/156; 356/380; 250/559.22
[58] Field of Search ...................... 702/156, 159, 702/170, 172; 73/149; 356/376, 380, 386, 387, 381, 379; 250/559.22, 559.23, 559.19, 559.24, 559.29, 559.21

[56] References Cited

U.S. PATENT DOCUMENTS

| | | | |
|---|---|---|---|
| 4,939,355 | 7/1990 | Rando et al. | 235/467 |
| 5,412,420 | 5/1995 | Ellis | 348/135 |
| 5,481,361 | 1/1996 | Yumiki et al. | 356/375 |
| 5,483,051 | 1/1996 | Marchi | 235/462 |
| 5,615,003 | 3/1997 | Hermary et al. | 356/3.03 |
| 5,629,773 | 5/1997 | Wakai et al. | 356/376 |
| 5,661,561 | 8/1997 | Wurz et al. | 356/386 |
| 5,723,852 | 3/1998 | Rando et al. | 235/467 |
| 5,739,426 | 4/1998 | Storm | 73/149 |
| 5,770,848 | 6/1998 | Oizumi et al. | 235/462 |
| 5,812,268 | 9/1998 | Jackson et al. | 356/376 |
| 5,831,719 | 11/1998 | Berg et al. | 356/5.13 |

FOREIGN PATENT DOCUMENTS

| | | |
|---|---|---|
| 0517958 | 12/1992 | European Pat. Off. . |
| 0600800 | 6/1994 | European Pat. Off. . |
| 3303109 | 8/1984 | Germany . |
| 2189594 | 10/1987 | United Kingdom . |
| WO 92/16818 | 10/1992 | WIPO . |

*Primary Examiner*—Patrick Assouad
*Attorney, Agent, or Firm*—Sughrue, Mion, Zinn, Macpeak & Seas, PLLC

[57] ABSTRACT

For measuring the volume, the process utilizes the same means as are used for reading an optical code, such as a laser scanner or CCD reader. A choice of different measuring procedures are proposed which suit different situations and are all based on scannings and readings performed on the object. Where required, the process can accommodate the inclination angles of the scan planes. The volume measurement is accompanied by the reading of an optical code provided on the object.

23 Claims, 9 Drawing Sheets

PROCESS AND APPARATUS FOR MEASURING THE VOLUME OF AN OBJECT

DESCRIPTION

BACKGROUND OF THE INVENTION

This invention relates to a process for measuring the volume of an object, and to an apparatus implementing the process.

A problem shared by many segments of industry and trade is that of assessing the volume of an object. In particular, the supply and shipment of goods demand that the volume of packages be measured in an automated fashion to provide an element of information which is valuable to the conduction of both the storehouse premises and the carrier means.

Storehouse premises and carriers generally handle objects according to their weight, and to one or more of their linear dimensions regarded as most significant. This handling style is, therefore, approximative and surely less than fully satisfactory.

SUMMARY OF THE INVENTION

Accordingly, a first aspect of the invention relates to a process for measuring the volume of an object, characterized in that a means of reading an optical code from the object is used.

Optical codes mean here graphical sequences wherein elements of information are recorded in a coded form which can be read by appropriate reading instruments. Examples of optical codes include bar codes, two-dimensional codes, color codes, etc..

In fact, in typical situations where the volume of an object is to be measured (such as package handling through a distribution system or storehouses and the like), an apparatus for reading optical codes would be already provided. The apparatus is inclusive of a set of components (laser units, signal processing units, and processing/storage units) which can be adapted to measure the volume of an object at the expense of a few minor changes and alterations.

Suitably, the optical code reading means comprises a laser scanner, preferably a modulated light scanner, operative to measure the range or distance of a spotted point. A scanner of this type is described, for instance, in U.S. Pat. No. 5,483,051 by this applicant.

Advantageously, the means of reading may comprise a CCD reader.

The volume may be measured by any of a number of different processes which form the subject matter of specific patent applications filed by the applicant on this same date. Only the basic features of these processes will be reviewed herein, and for a more detailed explanation, reference can be had to such patent applications.

According to a first of such processes, a volume measurement involves the following steps:

a) placing the object onto a bearing surface;
b) defining a feed direction for the object on the bearing surface;
c) defining a scan plane, intersecting the plane of the bearing surface along a scan base line which lies transverse to the feed direction, with a laser beam from a scanner that overlies the bearing surface being arranged to act in the scan plane;
d) moving the object across the bearing surface along the feed direction, relative to the scan plane, until the scan plane will intersect the object;
e) obtaining the height, above the bearing surface, of n points of measurement contained in a top face of the object and the scan plane;
f) defining a stipulated height as a function of the measured heights of two successive points of measurement;
g) obtaining the plan position on the bearing surface of the n points of measurement;
h) defining a stipulated base as a function of the plan positions on the bearing surface of each pair of adjacent points of measurement;
i) computing a stipulated area element, vertical to the bearing surface, for each pair of adjacent points of measurement, as by multiplying the stipulated base by the stipulated height;
j) computing a stipulated area as the combined sum of the stipulated area elements computed;
k) moving the object relative to the scan plane a predetermined feed distance along a feed direction across the bearing surface;
l) defining a stipulated thickness as a function of the feed distance;
m) computing a volume element by multiplying the stipulated area by the stipulated thickness;
n) repeating steps e) to m) above until the entire object is scanned;
o) computing the object volume as the combined sum of all the volume elements.

The term top face is here a generic one, it encompassing any surface seen by the laser scanner placed above the bearing surface. In particular, even a sloping side surface may be taken to be the top face, whose slope is an upward taper angle of the object as referred to its rest position on the bearing surface.

The movement of step d) above should be understood as a relative movement. Thus, it may either be a movement of the object relative to a fixed scan plane, or a movement of the scan plane relative to an object held stationary, or both.

According to a second of such processes, the volume measurement involves the following steps:

placing the object onto a bearing surface;
defining a feed direction for the object on the bearing surface;
defining a scan plane, intersecting the plane of the bearing surface along a scan base line which lies transverse to the feed direction, with a laser beam from a scanner that overlies the bearing surface being arranged to act in the scan plane;
defining a fixed Cartesian reference system having a longitudinal axis (y) along the feed direction, a transverse axis (x) orthogonal to the longitudinal axis (y), and a vertical axis (z) orthogonal to the plane of the bearing surface;
moving the object across the bearing surface, along the feed direction, relative to the scan plane until the scan plane will intersect the object;
effecting a scan sweep across the object in the scan plane by means of the scanner;
reckoning and storing a set of triads of coordinates (x, y, z) of n points of measurement of the object swept by the laser beam in the scan plane;
moving the object relative to the scan plane through a feed distance in the feed direction equal to a predetermined longitudinal resolution (L);
repeating the three last-mentioned steps until the entire object is scanned;

establishing a set of standard values (x") for the transverse coordinate separated by a value equal to a predetermined transverse resolution (T);

constructing, for each scan sweep, a set of equivalent triads (x", y", z") representing equivalent points, wherein the values of the transverse coordinate (x") are equal to the values of the standard set, and the values of the longitudinal coordinate (y") and the vertical coordinate (z") are respectively functions of the values of the reckoned longitudinal and vertical coordinates (y, z);

computing the volume included between the bearing surface (x, y) and the surface defined by those points which have equivalent coordinates (x", y", z").

Here again, the movement of the object across the bearing surface in the feed direction, with respect to the scan plane, should be understood as a relative movement.

According to a third of such processes, the volume measurement involves the following steps:

placing the object onto a bearing surface;

defining a feed direction for the object on the bearing surface;

defining a scan plane, intersecting the plane of the bearing surface along a scan base line which lies transverse to the feed direction, with at least one laser beam from the scanner that overlies the bearing surface being arranged to act in the scan plane;

defining a read plane intersecting the plane of the bearing surface along a read base line which lies transverse to the feed direction, light beams being active in the read plane which are picked up by the CCD reader located above the bearing surface;

moving the object across the bearing surface, along the feed direction, relative to the scan and read planes such that the object will cross these planes;

effecting a series of scan sweeps across the object in the scan plane with the laser beam, such that at each scan sweep, the positions of n points of measurement defining the object outline as spotted by the laser beam are reckoned;

effecting a corresponding series of readings of the object by means of the CCD reader to reckon, at each reading, the maximum width of the object outline as spotted by the CCD reader, each reading being offset in time with respect to the corresponding laser scan sweep by a necessary time period to allow the reading to be effected at the same location on the object where the scan sweep was effected;

processing the information from each scan sweep along with the information from the corresponding reading to define a set of stipulated outlines of the object;

computing the area of each stipulated outline;

computing a feed distance travelled by the object between two successive scan sweeps or between two successive readings;

computing, for each stipulated outline, an elementary volume as the product of the area of the stipulated outline by the feed distance;

computing the volume of the object as the combined sum of the elementary volumes.

Also in this third case, the movement of the object across the bearing surface in the feed direction, with respect to the scan plane, should be understood as a relative movement.

A second aspect of this invention is related to an optical apparatus for acquiring information about an object, which apparatus includes a means of reading an optical code associated with the object, and is characterized in that it includes a means of measuring the volume of the object.

This apparatus can implement the process outlined hereinabove.

Suitably, this apparatus includes at least one laser scanner which is part of both the optical code reading means and the volume measuring means; preferably, the laser scanner is a modulated light scanner adapted for measuring the range or distance of a spotted point.

Advantageously, the apparatus may additionally include a CCD reader.

Advantageously, the apparatus comprises:

a laser unit including a laser light source and a means of controlling and aiming it;

an analog signal processing unit receiving signals from the laser unit;

an A/D converter receiving, from the analog processing unit, signals related to the distance of the points being spotted by the laser;

a decoder unit receiving, from the analog processing unit, signals related to the optical code;

a processing/storage unit receiving signals from the A/D converter and the decoder unit.

In a first preferred embodiment:

the means of reading the optical code and means of measuring the volume share the laser unit, processing unit, and processing/storage unit;

the means of reading the optical code further includes the decoder unit;

the means of measuring the volume further includes the A/D converter.

It can be appreciated that in this embodiment of the invention, the volume measurement could merely involve the addition of an A/D converter to an apparatus for reading an optical code.

In a second preferred embodiment:

the means of reading the optical code and means of measuring the volume share the processing/storage unit;

the means of reading the optical code further includes a first laser unit, first processing unit, and the decoder unit;

the means of measuring the volume further includes a second laser unit, second processing unit, and the A/D converter.

Even in this, more complicated embodiment, the volume is measured by the same processing/storage unit as is provided for reading the optical code.

The layout of the apparatus components may be any one, for example arranged within the same scan/processing unit.

Advantageously, in a first preferred embodiment:

the processing/storage unit, first laser unit, first processing unit, decoder unit, and A/D converter are all laid within a scan/processing unit;

the second laser unit and second processing unit are laid within a scan unit.

Advantageously, in a second preferred embodiment:

the processing/storage unit, second laser unit, second processing unit, decoder unit, and A/D converter are all laid within a scan/processing unit;

the first laser unit and first processing unit are laid within a scan unit.

Advantageously, in a third preferred embodiment:

the processing/storage unit, decoder unit, and A/D converter are all laid within a processing unit;

the first laser unit and first processing unit are laid within a first scan unit;

the second laser unit and second processing unit are laid within a second scan unit.

Scan-only units take up less space than processing units or scan/processing units. Accordingly, the arrangements of the apparatus members which include a scan-only unit are to be preferred where space requirements are critical in the object scan zone.

Advantageously, the laser unit may comprise two laser emitters and a single moving-mirror deflector, the deflector having two discrete sets of mirror surfaces at an angle to one another for the emitter pair. This dual scanner configuration allows the scanning to be performed in different planes for code reading and volume measurements, while using a single moving-mirror deflector.

BRIEF DESCRIPTION OF THE INVENTION

Further features and advantages of the invention will be apparent from the following detailed description of some preferred embodiments thereof, given with reference to the accompanying drawings. In the drawings.

DETAILED DESCRIPTION OF THE INVENTION

Figure 1:
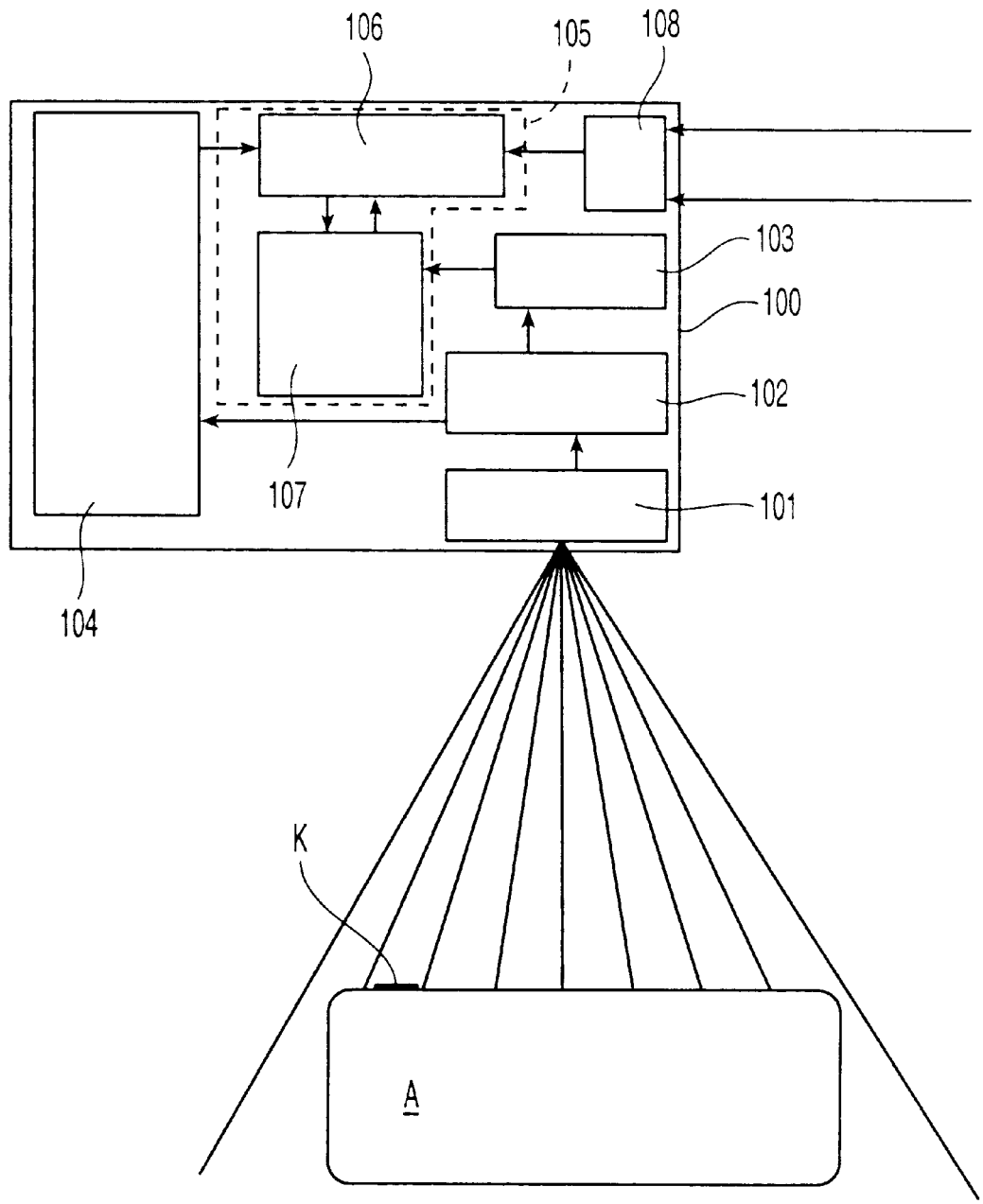
FIGS. 1, 2, 3 and 4 are block diagrams of apparatus according to this invention.

Shown in FIG. 1 is a block diagram of a first embodiment of an apparatus for reading an optical code K and measuring the volume of an object A, which apparatus comprises a scan/processing unit 100 having a laser unit 101 (including at least one modulated light laser emitter adapted to read the optical code K and measure a distance, such as the scanner described in U.S. Pat. No. 5,483,051, and a means of controlling and aiming it), an analog processing unit 102, an A/D converter 103, a decoder unit 104, and a processing/storage unit 105 (including a processor 106 and a memory 107), and an input/output interface 108. The analog processing unit 102 receives signals from the laser unit 101, and sends the signal conveying the distance information (for the volume measurement, as explained hereinafter) to the A/D converter 103, and the signal conveying the information contained in the optical code K to the decoder unit 104. The A/D converter 103 and decoder unit 104 process the incoming signals and send them to the processing/storage unit 105. In this embodiment, both the optical code K reading and the volume measurement are effected by the unit 100.

Figure 2:
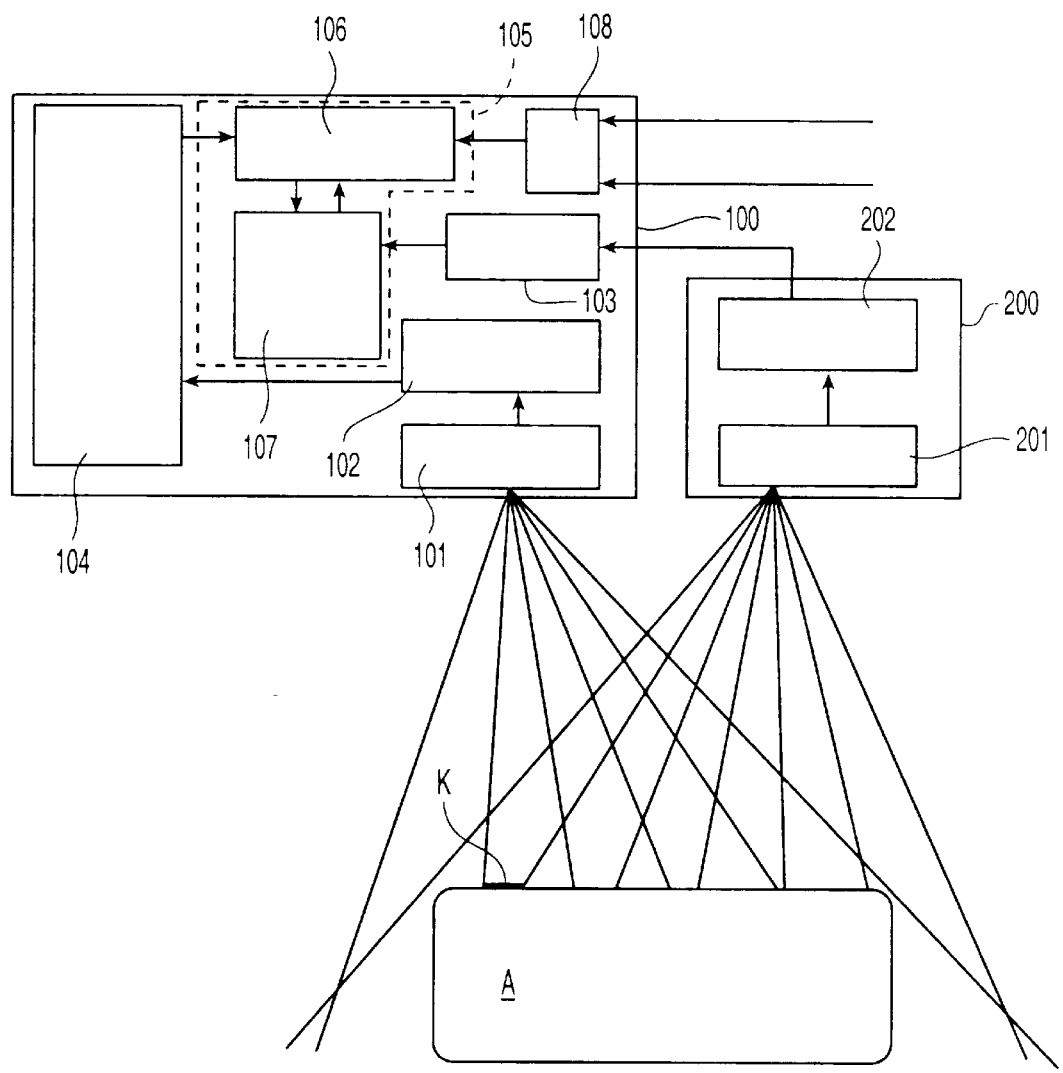

Shown in FIG. 2 is a block diagram of a second embodiment of the apparatus for reading the optical code K and measuring the volume of the object A. This embodiment differs from the first in that it includes a scan-only unit 200 associated with the scan/processing unit 100. The unit 100 is substantially same as that in FIG. 1, except that the analog processing unit 102 is sending the signals to the decoder unit 104, not to the A/D converter 103. The scan-only unit 200 comprises a second laser unit 201 and second analog processing unit 202; the unit 200 is connected to the unit 100 such that the second analog processing unit 202 will send the signals to the A/D converter 103. In this embodiment, the optical code K reading is effected by the unit 100, while the volume measurement is effected in part (limited to the reckoning step thereof) by the unit 200.

Figure 3:
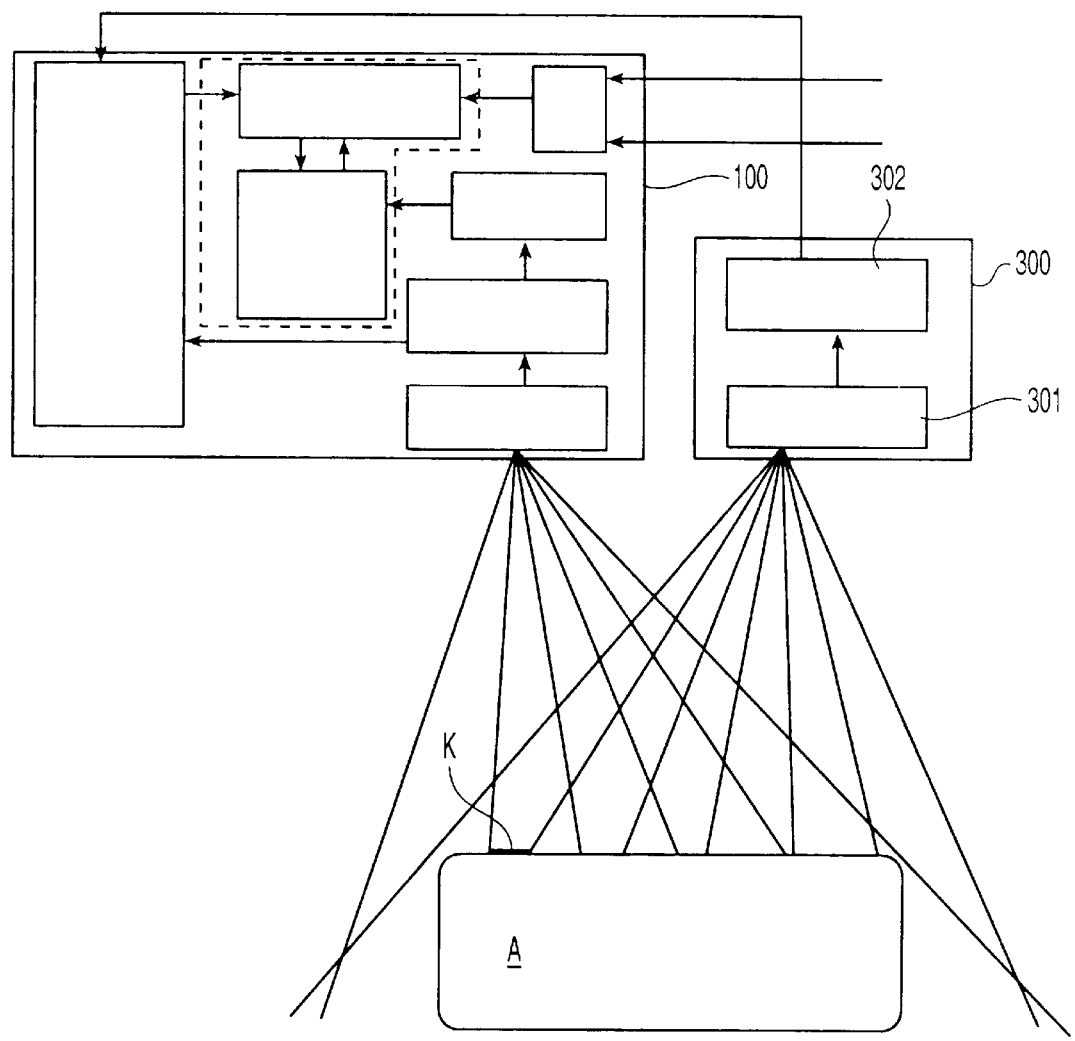

FIG. 3 shows a block diagram of a third embodiment of the apparatus for reading the optical code K and measuring the volume of the object A. This embodiment reciprocates the previous one. In fact, it includes a scan-only unit 300 which comprises a second laser unit 301 and second analog processing unit 302; the unit 300 is connected to the unit 100 such that the second analog processing unit 302 will send the signals to the decoder unit 104. In this embodiment, the volume measurement is effected by the unit 100, while the optical code K reading is effected in part (limited to the reckoning step thereof) by the unit 300.

Figure 4:
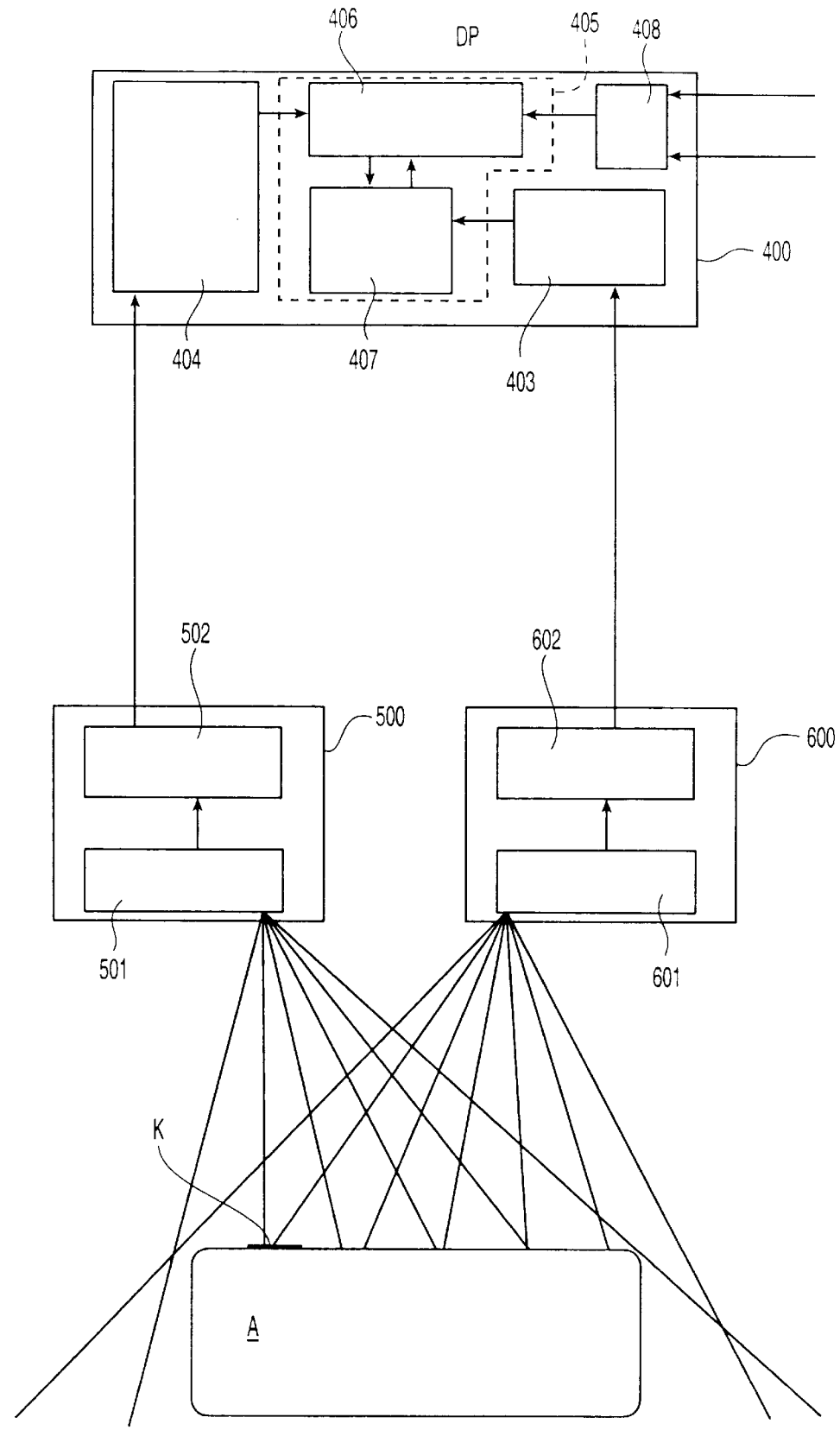

FIG. 4 shows a block diagram of a fourth embodiment of the apparatus for reading the optical code K and measuring the volume of the object A. This embodiment includes a process-only unit 400 and two scan-only units 500 and 600. The unit 400 comprises a processing/storage unit 405 (including a processor 406 and a memory 407), a decoder unit 404, an A/D converter 403, and an input/output interface 408; each of the units 500, 600 comprises a laser unit 501, 601 (including at least one laser emitter and a means of controlling and aiming it), and an analog processing unit 502, 602. The units 400, 500 and 600 are connected such that the analog processing unit 502 will send the signals to the decoder unit 404, and the analog processing unit 602 send the signals to the A/D converter 403. In this embodiment, the optical code K reading and the measurement of the object A volume are effected in part (limited to the reckoning step thereof) by the scan-only units 500 and 600, respectively; both operations being then completed by the process-only unit 400.

Figure 6:
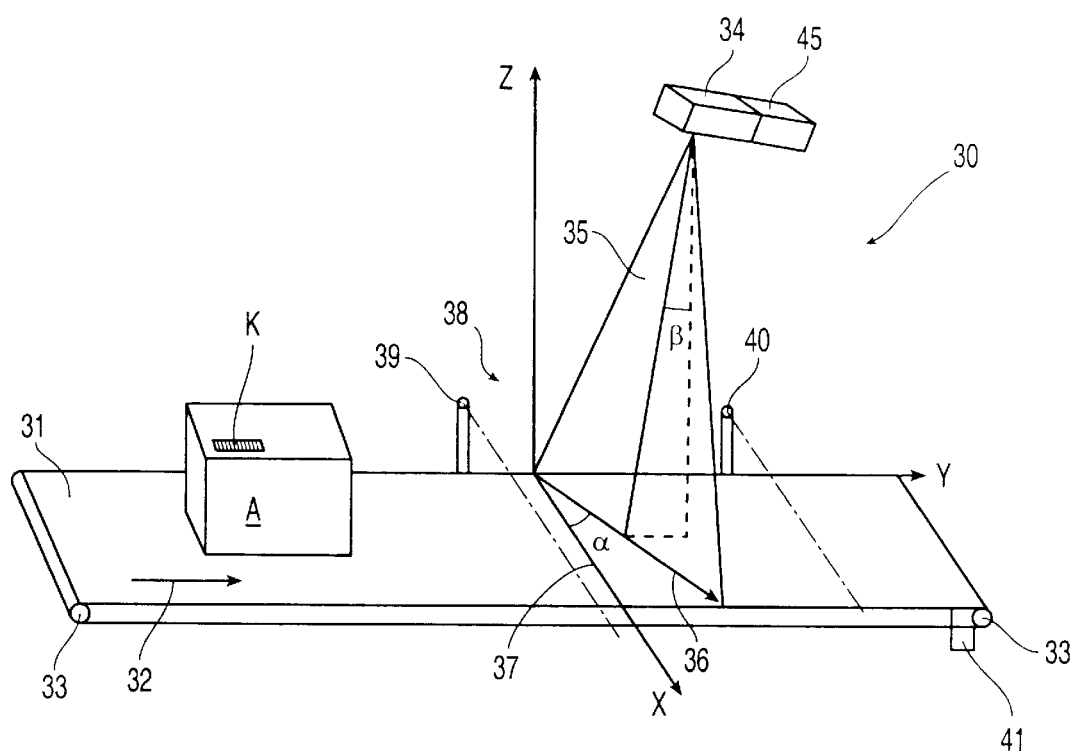
Figure 7:
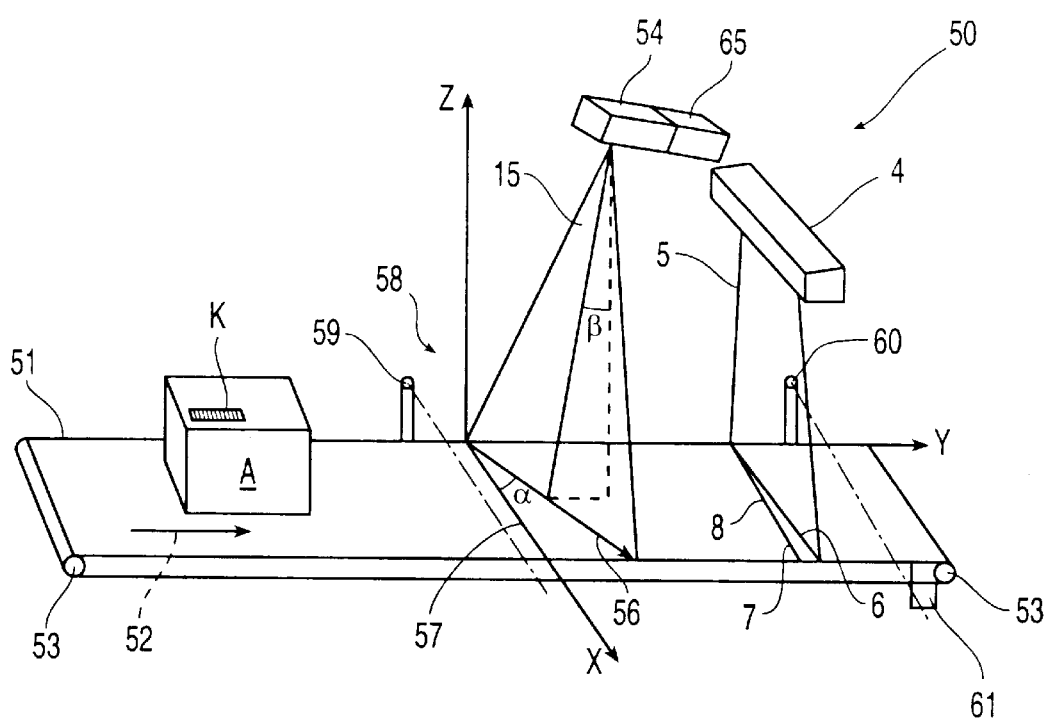

In any of the four embodiments above, volume may be measured with different processes. Hereinafter, some of the processes will be discussed in connection with apparatus as shown in FIGS. 5, 6 and 7, which all correspond to the block diagram of FIG. 1; it should be understood, however, that the same processes would equally apply to the apparatus illustrated by the block diagrams of FIGS. 2, 3 and 4.

Figure 5:
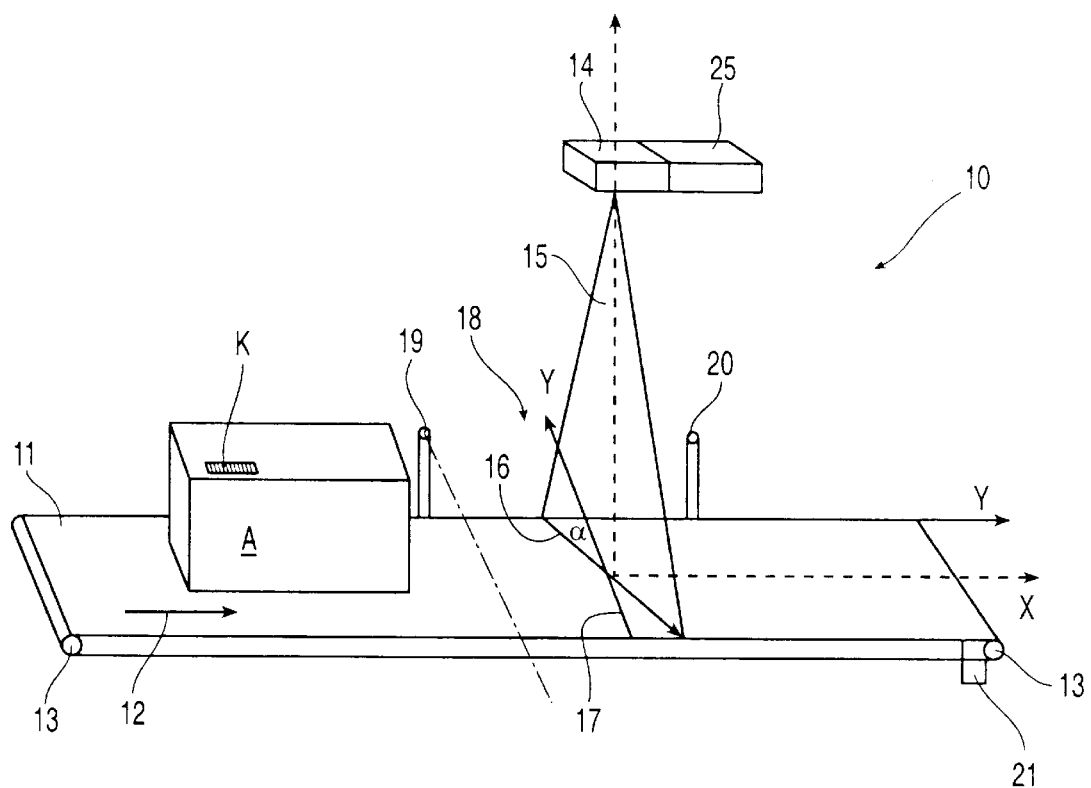
FIGS. 5, 6 and 7 are perspective views showing schematically apparatus according to the invention.

Shown in FIG. 5 is an apparatus 10 which includes a bearing surface 11 for objects A to be measured for volume. The bearing surface 11 is substantially horizontal and consists preferably of a belt conveyor, also denoted by the numeral 11, which can be driven along a feed direction 12 and is guided by rollers 13, one of which is powered.

The apparatus 10 includes a modulated light laser scanner 14 capable of measuring a range or distance, e.g. the scanner described in U.S. Pat. No. 5,483,051 by this applicant, it utilizing a laser beam arranged to sweep a scan plane 15 incident onto the plane of the bearing surface 11. Specifically, the scanner 14 is placed above the bearing surface 11; the scan plane 15 is perpendicular to the bearing surface 11 and intersects it along a scan base line 16; and the scan base line 16 is inclined at an angle α to a line 17 of the bearing surface 11 which lies perpendicularly to the feed direction 12.

The section of the bearing surface 11 next to the scan base line 16, and indicated as the scan zone 18, is bounded by an entry detector 19 and an exit detector 20, both preferably comprised of photocells.

Figure 8:
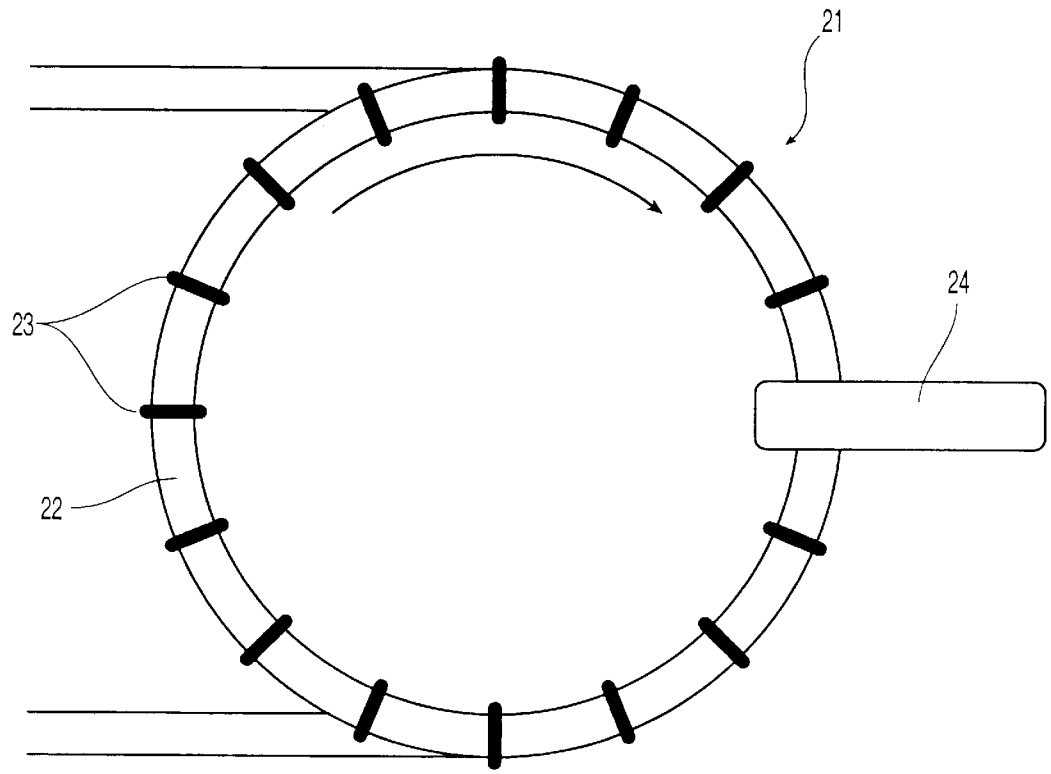
FIG. 8 is a schematic view of an encoder used in an apparatus according to the invention.

The bearing surface 11 is provided with an encoder 21, that is with a device adapted to issue a signal each time that the bearing surface 11 is moved exactly through a predetermined feed distance. The encoder 21 may be of any type, e.g. electro-optical as shown schematically in FIG. 8. One of the rollers 13 carries, rotatively fixed with it, a disk 22 which is marked with notches 23 at substantially tangential positions with respect to the plane of the bearing surface 11 and formed at circumferential spacings equal to the feed distance sought; an electro-optical notch recognition device 24 is arranged to "see" the notches 23 moving past it and output a signal at each passing notch 23.

Also provided is a processing unit 25, which may be incorporated to the scanner 14, or separate and suitably connected to it.

The apparatus 10 operates as follows. Objects A to be measured for volume are placed onto the belt conveyor 11, at a spacing from one another. The continuous motion of the belt conveyor 11 will take each object A to the entry detector 19, and then into the scan zone 18. The object movement past the entry detector 19 triggers the delivery of a signal to the processing unit 25, whereby the unit will initiate the measuring procedure.

The encoder 21 also delivers a signal to the processing unit 25, during the movement of the belt conveyor 11, each time that the belt conveyor 11, carrying the object A, travels a distance same as the predetermined feed distance. Each time that a signal is received from the encoder 21, a scanning operation is performed; the scanner 14, once enabled by the sensor 19, will in fact scan the object A continuously, but the processing unit 25 only store the n values of the corresponding scan sweep to the encoder signal. It should be noted that the infeed speed of the belt conveyor 11, albeit quite fast, is far slower than the sweep rate of the laser beam of the scanner 14, so that the distance moved by the object A relative to the scan plane 15 during the time taken by the scanner 14 for a full sweep across the scan plane 15 is quite trivial.

Upon the object A reaching the scan base line 16, the laser beam of the scanner 14 will impinge on the object A. Under control by the processing unit 25, the scanner 14 will reckon the height, above the bearing surface 11, of n points of measurement on the top face of the object A.

To this aim, the scanner 14 reckons, for each point of measurement, both its distance from the scanner 14 (or rather, from the imaginary point whence the rays appear to issue) and the angular position of the laser beam, thereby obtaining the values in polar coordinates of the position of that point in the scan plane 15. These values are then processed by the unit 25 to obtain values therefrom which are representative of the position of the point in a system of Cartesian coordinates wherein the x axis is coincident with the feed direction, the y axis is directed along the line 17 (that is, such that the x-y plane will coincide with that of the bearing surface 11), and the z axis directed upwards. For this conversion, the angle a (i.e., the slope of the scan line with respect to the y axis) and the scanner position must be known. The computations involved in this conversion will not be discussed herein because known per se and well within the capability of a person of ordinary skill in the art. Of course, any other selected Cartesian reference system in space could be reduced to that indicated, by a mathematical operation of rotation/translation, and accordingly, can be regarded as equivalent to the indicated system.

At each scan sweep, the reckoning is effected for a predetermined number, n, of points on the object A top face, thereby obtaining the cross-sectional outline of the top face of the object in the scan plane 15, by spot approximation.

During the scanning, for each pair of successive reckoning points, the processing unit 25 will calculate an elementary area as the product of a stipulated height by a stipulated base, and store it.

The stipulated height may be the height above the bearing surface 11 (i.e., the z coordinate) of the first or the second point in the pair, or be the smaller or larger thereof, or a average therebetween; the stipulated height is selected according to the type of approximation sought and the complexity of the computation to be required of the processing unit 25. This aspect will be best appreciated at the end of the description of the whole measuring procedure.

The stipulated base may simply be the difference between y coordinates of the two points (case a), or be the distance between the two projected points onto the x-y plane (case b).

On completion of a scanning sweep, and after the values of the corresponding elementary areas to all the pairs of points have been stored, a stipulated area is computed as the combined sum of all the elementary areas of that scan sweep. The computed stipulated area may be differently interpreted, according to which stipulated base has been selected for each pair of reckoning points.

If the distance between the projections of the two points of reckoning onto the plane x-y is selected for the stipulated base (case b), then the stipulated area is an approximate measurement of the cross-section area of the object in the scan plan.

If the difference between y coordinates of the reckoning points is selected for the stipulated base (case a), then the stipulated area represents no longer the measurement of the object cross-section area in the scan plane, but rather its projection onto the y-z plane, again in an approximate way.

In either cases, the approximation is due to two errors. A first error originates from that the area included between the intersection of the scan plane with the object top face and the bearing surface (or x-y plane) is considered, and the possible presence of dimples in the side and under faces of the object neglected. This error cannot be controlled by this measuring process, and must be accepted. However, as previously mentioned, a measurement affected by such an error would still suit the purpose of the inventive process, and even better so than a true measurement. The second error is due to that only a few points on the intersect of the scan plane with the object top face are picked up for reckoning. This error can be minimized as desired, or at least controlled as required, by either increasing the number of reckoning points or suitably selecting the stipulated height. In fact, selecting the smallest height value would result in the area being measured to the nearest number below, and selecting the largest value would result in the area being measured to the nearest number above. Selecting the average value between the z heights of the two adjacent reckoning points would attenuate the error, but fail to presumptively specify whether the error is one to the nearest number above or below. Selecting the height of either the first or the second point allows of no control.

In the next step, the stipulated area is multiplied by a stipulated thickness to provide an elementary volume. In case a, the stipulated thickness will be assumed to be equal to the feed distance, In case b, account must be taken of the slope of the scan line to the y axis; accordingly, the stipulated thickness will be assumed to be equal to the feed distance multiplied by $\cos\alpha$. In either cases, the elementary volume corresponds (with the same allowance as previously made for the stipulated area) to the volume of the object portion spanning two successive scan sweeps.

Thereafter, it is waited until the object A moves through a predetermined feed distance; this being signalled by the encoder 21 controlling a fresh scanning. In this way, successive cross-sections of the object A are scanned, each time computing the stipulated area and the elementary volume. All the computed values of elementary volume are stored into the processing unit.

This goes on as long as the object A locates in the scan zone 18. At a certain point, the exit detector 20 will signal that the object A has gone out of the scan zone 18; thereupon, the processing unit 25 will terminate the measuring procedure and add together all the elementary volumes stored during the scan sweeps, thereby to provide an approximate measurement of volume of the object A.

It should be noted that when the angle $\alpha$ is a small one, less than 15°, the error introduced by neglecting it is minimal, on the order of a few percent; on the other hand, an attempt to take it into account would entail substantial complexity for the computations. In many instances of practical applications of an apparatus according to the invention, it may be convenient, in order to minimize its manufacturing, installation, and setting up costs, to keep the angle $\alpha$ small (preferably in the 5° to 10° range, and nowhere larger than 15°), and just ignore the effect thereof.

The start and end of an object volume measuring procedure, as just described, are controlled by the movement of the object past the entry detector 19 and the exit detector 20. Alternatively, one or both of these detector may be omitted, and their function served by the processing unit 25 using appropriate software to enable the measuring procedure (as by clearing the count of elementary volumes) upon a scan sweep corresponding to a non-zero stipulated area, and stop it (as by detecting the sum of the stored elementary volumes) upon completion of a predetermined consecutive number of scan sweeps with zero stipulated area; this number may be as low as 1, or at any rate a small number.

Where the measuring procedure is initiated by a software means, the scanner 14 must be kept operating all the time, even if no measuring procedure is in progress, in order for the arrival of an object to be detected. On the other hand, the provision of an entry detector 19 allows the scanner 14 to be disabled when there are no objects to be measured, and accordingly, despite the added complication to the structure entailed thereby, it is preferred wherever a markedly discontinuous inflow of objects for measurement is anticipated. By contrast, the presence or absence of an exit detector 20 would not impair the ability to turn off the scanner 14 at the end of the measuring procedure. Therefore, the preference goes to the embodiment wherein the end of the measuring procedure is detected by software means.

In certain cases, a higher degree of accuracy may be needed in computing the volume of objects which are markedly irregular in shape, that is objects having bulging portions which cannot be neglected. In such cases, additional scanners may be arranged on one or both sides of the belt conveyor 11. Thus, a more accurate assessment of the volume can be obtained by measuring the distances of points on the side surfaces. It could also be arranged for the belt conveyor 11 to be transparent to laser light, and another laser to be placed under the belt; the bottom laser would then measure the distances of points on the underside of the object to thereby provide a true measurement of volume.

In the apparatus described hereinabove, the information about an object A provided by scanning, i.e. the measurement of its volume and any information to be obtained by reading the optical code K, is preferably recorded in a record of a file stored within the processing unit, so that the file will ultimately contain information covering all the objects that have been moved across the bearing surface. This information can later serve various purposes, e.g. conducting the storehouse premises or loading carriers, printing labels to be attached to the objects, or else.

FIG. 6 shows an apparatus 30 which includes a bearing surface 31 for objects A to be measured for volume. The bearing surface 31 is substantially horizontal and consists preferably of a belt conveyor, also denoted by the numeral 31, which can be driven along a feed direction 32 and is guided by rollers 33, one of which is powered.

The apparatus 30 includes a modulated light laser scanner 34 capable of measuring a distance, such as that described in U.S. Pat. No. 5,483,051 by this applicant, and utilizing a laser beam which sweeps a scan plane 35 incident onto the plane of the bearing surface 31. Specifically, the scanner 34 is placed above the bearing surface 31; the scan plane 35 is set at an angle $\beta$ from the perpendicular to the plane of the bearing surface 31 and intersects this plane along a scan base line 36; the scan base line 36 is inclined at an angle $\alpha$ to a line 37 of the bearing surface 31 which lies perpendicularly to the feed direction 32.

The section of the bearing surface 31 next to the scan base line 36 and indicated as the scan zone 38, is bounded by an entry detector 39 and an exit detector 40, being both preferably comprised of photocells.

The bearing surface 31 is provided with an encoder 41, that is with a device adapted to issue a signal each time that the bearing surface 31 is moved exactly through a predetermined feed distance L. The encoder 41 may be of any type, e.g. electro-optical like the encoder 21 shown schematically in FIG. 8 and described hereinabove.

Also provided is a processing unit 45, which may be incorporated to the scanner 34, or separate and suitably connected thereto.

The apparatus 30 operates as follows. Objects A to be measured for volume are placed onto the belt conveyor 31, at a spacing from one another. The continuous motion of the belt conveyor 31 will take each object A to the entry detector 39, and then into the scan zone 38. The object movement past the entry detector 39 triggers the delivery of a signal to the processing unit 45, whereby the unit will initiate the measuring procedure.

The encoder 41 also delivers a signal to the processing unit 45, during the movement of the belt conveyor 31, each time that the belt conveyor 31, carrying the object A, travels a distance same as the predetermined feed distance L. Each time that a signal is received from the encoder 41, a scanning operation is performed; the scanner 3, once enabled by the sensor 39, will in fact scan the object A continuously, but the processing unit 45 only store the n values of the corresponding scan sweep to the encoder signal. It should be noted that the infeed speed of the belt conveyor 31, fast as it may be, is far slower than the sweep rate of the laser beam of the scanner 34, so that the distance moved by the object A relative to the scan plane 35 during the time taken by the scanner 34 for a full sweep across the scan plane 35 is quite trivial.

Upon the object A reaching the scan base line 36, the laser beam of the scanner 34 will impinge on the object A. Under control by the processing unit 45, the scanner 34 will reckon the positions of n points of measurement spotted by the laser beam on the object A.

To this aim, the scanner 34 reckons, for each point of measurement, both its distance from the scanner 34 (or rather, from the imaginary point whence the rays appear to issue) and the angular position of the laser beam, thereby obtaining the values in polar coordinates of the position of that point in the scan plane 35. These values are then processed by the unit 45 to obtain values therefrom which are representative of the position of the point in a system of Cartesian coordinates having a longitudinal y axis coincident with the feed direction, a transverse x axis directed along the line 37 (that is, such that the x-y plane will coincide with that of the bearing surface 31), and a vertical z axis directed upwards. For this conversion, the angle $\alpha$ (i.e., the slope of the scan line 36 with respect to the y axis), the angle $\beta$ (i.e., the slope of the scan plane 35 with respect to the perpendicular to the bearing surface 31), and the scanner 34 position must be known. The computations involved in this conversion will not be discussed herein because known per se and well within the capability of a person of ordinary skill in the art. Of course, any other selected Cartesian reference system in space could be reduced to that indicated, by a mathematical operation of rotation/translation, and accordingly, can be regarded as equivalent to the indicated system.

At each scan sweep, the reckoning is effected for a predetermined number, n, of points on the object A, being careful to span the whole bearing surface 31. Thus, a set of coordinate triads x, y, z are obtained which represent the outline of a cross-section through the object in the scan plane 35.

Thereafter, it is waited until the object A moves through a predetermined feed distance L; this is signalled by the encoder 41 controlling a fresh scanning. In this way, successive cross-sections of the object A are scanned, reckoning each time one set of coordinate triads x, y, z. All the sets of triads x, y, z are then stored into the processing unit 45.

This goes on as long as the object A locates in the scan zone 38. At a certain point, the exit detector 40 will signal that the object A has moved out of the scan zone 38; thereupon, the processing unit 45 will terminate the measuring procedure.

The reckoned triads x y z are then processed for a most convenient determination of volume.

First, a set of standard x" values is established, each spaced from the next by a value equal to a predetermined transverse resolution T. The value of T may be of 1 cm, for example; this value has proved suitable for volume measurements of packages intended for shipment which have overall hamper dimensions on the order of a few decimeters.

Next, the triads x, y, z are normalized to the x" set.

In a first mode, for each reckoned triad set that are stored during one scanning, the x values are compared to the x" values, to check if a triad, referred to as the neighboring triad, exists for each x" value whose x value lies much closer to the x" value than the x values of the other triads. A first value $x_a$ is considered to lie much closer than a second value $x_b$ to a value $x"_1$, if the distance of the second value is at least twice as great as that of the first, i.e. if $x_b-x"_1 > 2(x_a-x"_1)$.

In the affirmative, that is if a neighboring triad exists, an equivalent triad x"=y, z"=z (representing an equivalent point) is then obtained from the neighboring triad x y z by substituting the normalized x" value for the reckoned x value.

In the negative, two points are then considered, referred to as nearby points herein, whose triads $x_a$, $y_a$, $z_a$ and $x_b$, $y_b$, $z_b$ have the values $x_a$ and $x_b$ immediately below and above x", that is the largest of the smaller (or equal) values than (to) x", and the smallest of the larger (or equal) values than (to) x"; then, the two arithmetic means between $y_a$ and $y_b$ and between $z_a$ and $z_b$ are taken. Finally, the equivalent triad x", y", z" are constructed where y" and z" are said two arithmetic means.

Alternatively, the equivalent points and their equivalent triads x", y", z" may be obtained as follows. Instead of checking for the existence of a neighboring point, again two nearby points are taken which can be either spotted as indicated above, that is as the points whose triads $x_a$, $y_a$, $z_a$ and $x_b$, $y_b$, $z_b$ have the values $x_a$ and $x_b$ immediately below and above the specific x" value, or as the points whose triads $x_a$, $y_a$, $z_a$ and $x_b$, $y_b$, $z_b$ have the closest values $x_a$ and $x_b$ to x". Notice that these two determination processes are not necessarily coincident, especially where the number of reckoned points x, y, z is much higher than the number of standard x" values; with the second process, in fact, both nearby points may happen to have a transverse x coordinate which is larger or smaller than the x" value.

Once the two nearby points are determined in either ways, the equivalent point is determined by interpolation as the intersect of a line, joining the two nearby points, with the vertical plane having a transverse coordinate equal to the specific x" value. In other words, the longitudinal and vertical coordinates of the object are re-constructed at the vertical planes whose transverse x" coordinates are equal to the values of the standard set, using the longitudinal and vertical coordinates as actually measured at different transverse x coordinates.

This second embodiment form looks more accurate than the previous one, since in determining the coordinates of the equivalent points, different weights are automatically given to the data used according to the distance of the points actually measured with respect to the equivalent points.

All of the foregoing is repeated, in accordance with the selected one of the above forms, for each triad of each scanning, thereby obtaining a set of equivalent triads x", y", z" at each scanning.

The triads x", y", z" thus obtained cannot be used yet for directly measuring the volume of the object A, due to the slope $\beta$ and to the shape of the object A possibly being an undefined one. For example, by multiplying the area of each scanned cross-section (to be computed by the known triad set of that scan sweep) by the feed distance, and adding together all the elementary volumes thus obtained, some significant errors may be incurred especially with tall and short objects; in fact, one vertical front face would be scanned at different heights with several successive sweeps to produce a number of cross-sections having increasing heights instead of one cross-section of appropriate height. In practice, an error would be introduced by that the movement of the scanned points along the y axis has not been taken into account.

Accordingly, in place of each y coordinate, a modified y' coordinate is used which has been obtained by taking into account the feed movement of the object A.

According to a first possibility, the modified y' coordinate is obtained as the difference between the y coordinate of a scanning point and the y coordinate of the corresponding point (i.e., the point that has been found associated with the same x" value) in the previous scan sweep, plus the feed distance L; briefly, $y'=y-[y_{prec}+L]$.

According to another possibility, the modified y' coordinate is obtained as the measured value y minus a number of feed distances L equal to the number m of scannings performed up to that time; briefly, $y'=y-mL$.

Notice that triads x, y', z modified with the y' values obtained as just described provide a faithful representation of the true outline of the object, since account has been taken of the movements along the y axis, and could be used to compute the volume directly without going through the equivalent triads. However, a computation of volume based directly on such modified triads would be decidedly complicated and require expensive high capacity computer means quite unsuitable for general applications. Thus, an approximate computation is resorted to as indicated.

The equivalent triads x", y", z" define (with spot approximation) a surface overlying the bearing surface x-y. The volume included between that surface and the bearing surface x-y gives a reasonably approximated value of the volume of the object A.

This volume can be computed in any of several ways, also more or less approximate, and hence by more or less complex computation. Described here below is a computation process which is specially convenient in that it provides a reasonably close approximation for fairly simple calculations.

Starting from the equivalent triads x", y", z", viewed as points on the aforesaid surface, the projections of such points onto the bearing surface x-y are considered; in practice, the points with coordinates x", y", z"=0 are considered. These points define, in the plane x-y of the bearing surface a grid formed of trapezoids with their parallel side pairs lying all parallel to one another (as mentioned, the values x" are the standard ones, the same for all the sets of triads derived from successive scan sweeps). Thus, the area of each trapezoid can be calculated and multiplied by a stipulated height of the trapezoid to obtain an elementary volume; the overall volume will, therefore, be the combined sum of the elementary volumes.

The area of each trapezoid is readily obtained as the product of the sum of the two parallel sides by the height separating them, divided by two; the two parallel sides can be obtained as the difference Δy of the y" coordinates of those points which have the same x" coordinate, the height between the parallel sides being the transverse resolution T.

The stipulated height of the elementary volume is preferably obtained as the average between the four values z" associated in the equivalent triads with the values x", y" of the trapezoid corners. To simplify the computation, one of the four values z" may be taken directly as the height of the elementary volume.

The start and end of the procedure for measuring the volume of an object, as just described, are governed by the movement of the object past the entry detector 39 and the exit detector 40. Alternatively, one or both detectors could be omitted. Their functions would then be served by the processing unit 45 using appropriate software to activate the measurement when a non-zero height z corresponds to a scan sweep, and stop it on the occurrence of a predetermined consecutive number of zero height scan sweeps; this number may be as low as 1, or at any rate be a small number.

Where the measuring procedure is started from software, the scanner 34 must be kept operating all the time, even if no measuring procedure is in progress, in order for the arrival of an object to be detected. On the other hand, the provision of an entry detector 39 allows the scanner 34 to be disabled when there are no objects to be measured, and accordingly, despite the added complexity it entails in the apparatus construction, it is preferred wherever a markedly discontinuous inflow of objects for measurement is anticipated. By contrast, the presence or absence of an exit detector 40 would not impair the ability to turn off the scanner 34 at the end of a measuring procedure. Therefore, the preference would usually go to the embodiment wherein the end of the measuring procedure is detected by software means.

Preferably, the apparatus 30 further includes a means of reading an optical code K (such as a bar code, a two-dimensional code, a color code, or the like) associated with the object A. A dedicated scanner could be provided or the scanner 34 itself used for the purpose.

The embodiment form is specially advantageous wherein the apparatus 30 is used with just the scanner 34 mounted at an angle β from the vertical to the bearing surface 31; this inclination corresponds, in fact, to the preferred working position of a scanner for reading optical codes.

In the apparatus described hereinabove, the information about an object A provided by the scanning, i.e. the measurement of its volume and any information to be obtained by reading the optical code K, is preferably recorded in a record of a file stored within the processing unit, so that the file will ultimately contain information covering all the objects that have been moved across the bearing surface. This information can later serve various purposes, e.g. conducting the storehouse premises or loading carriers, printing labels to be attached to the objects, or else.

In certain cases, a higher degree of accuracy may be needed in computing the volume of objects which are markedly irregular in shape, that is objects having bulging portions which cannot be neglected. In such cases, additional scanners may be arranged at one or both sides of the belt conveyor 31. Thus, a more accurate assessment of the volume can be obtained by measuring the distances of points on the side surfaces. It could also be arranged for the belt conveyor 31 to be transparent to laser light, and another laser to be placed under the belt; the bottom laser would then measure the distances of points on the underside of the objects to thereby provide a true measurement of volume.

Shown in FIG. 7 is an apparatus 50 which comprises a bearing surface 51 for objects A to be measured for volume. The bearing surface 51 is substantially horizontal and consists preferably of a belt conveyor, also denoted by the numeral 51, which can be driven along a feed direction 52 and is guided by rollers 53, one of which is powered.

The apparatus 50 includes a modulated light laser scanner 54 capable of measuring a distance, e.g. a similar one to that described in U.S. Pat. No. 5,483,051 by this applicant. The scanner 54 utilizes a laser beam which sweeps a scan plane 55 incident onto the plane of the bearing surface 51. Specifically, the scanner 54 is placed above the bearing surface 51; the scan plane 55 is set at an angle β from the perpendicular to the plane of the bearing surface 51 and intersects this plane along a scan base line 56; the scan base line 56 is inclined at an angle a to a line 57 of the bearing surface 51 which lies perpendicularly to the feed direction 52.

The apparatus 50 also includes a CCD (Charge Coupled Device) reader, shown at 4, which comprises a matrix of very many individual light-sensitive elements arranged into one or more straight arrays (of which only one is used). The CCD reader 4 acts in a read plane 5 which is vertical to the bearing surface 51. The read plane 5 intersects the plane of the bearing surface 51 along a read base line 6 lying at an angle γ with respect to a line 7 of the bearing surface 51 which lies perpendicularly to the feed direction 52.

The section of the bearing surface 51 next to the scan base line 56 and the read base line 6, and indicated as the scan/read zone 58, is bounded by an entry detector 59 and an exit detector 60, being both preferably comprised of photocells. A lamp (not shown) is arranged to illuminate the scan/read zone 58 in order for the CCD reader 4 to operate its reckoning.

The bearing surface 51 is provided with an encoder 61, that is with a device adapted to issue a signal each time that the bearing surface 51 is moved exactly through a predetermined feed distance L. The encoder 61 may be of any type, e.g. electro-optical like the encoder 21 shown schematically in FIG. 8 and described hereinabove.

Also provided is a processing unit 65, which may be incorporated to the scanner 54, or separate and suitably connected to both the scanner 54 and the CCD reader 4.

The apparatus 50 operates as follows. Objects A to be measured for volume are placed onto the belt conveyor 51, at a spacing from one another. The continuous motion of the belt conveyor 51 will take each object A to the entry detector 59, and then into the scan/read zone 58. The object movement past the entry detector 59 triggers the delivery of a signal to the processing unit 65, whereby the unit will initiate the measuring procedure.

The encoder 61 also delivers a signal to the processing unit 65, during the movement of the belt conveyor 51, each time that the belt conveyor 51, carrying the object A, travels a distance same as the predetermined feed distance. Each time that a signal is received from the encoder 61, a scanning operation is performed; the scanner 54, once enabled by the sensor 59, will in fact scan the object A continuously, but the processing unit 65 only store the n values of the corresponding scan sweep to the encoder signal. It should be noted that the infeed speed of the belt conveyor 51, fast as it may be, is far slower than the sweep rate of the laser beam of the scanner 54, so that the distance moved by the object A relative to the scan plane 55 during the time taken by the scanner 54 for a full sweep across the scan plane 55 is quite trivial.

Upon the object A reaching the scan base line 56, the laser beam of the scanner 54 will impinge on the object A. Under control by the processing unit 65, the scanner 54 will reckon the positions of n points of measurement spotted by the laser beam on the object A.

To this aim, the scanner 54 reckons, for each point of measurement, both its distance from the scanner 54 (or rather, from the imaginary point whence the rays appear to issue) and the angular position of the laser beam, thereby obtaining the values in polar coordinates of the position of that point in the scan plane 55. These values are then processed by the unit 65 to obtain values therefrom which are representative of the position of the point in a system of Cartesian coordinates having the y axis coincident with the feed direction, the x axis directed along the line 57 (that is, such that the x-y plane will coincide with that of the bearing surface 51), and the z axis directed upwards. For this conversion, the angle $\alpha$ (i.e., the slope of the scan line 56 with respect to the y axis), the angle $\beta$ (i.e., the slope of the scan plane 55 with respect to the perpendicular to the bearing surface 51), and the scanner 54 position must be known. The computations involved in this conversion will not be discussed herein because known per se and well within the capability of a person of ordinary skill in the art. Of course, any other selected Cartesian reference system in space could be reduced to that indicated, by a mathematical operation of rotation/translation, and accordingly, can be regarded as equivalent to the indicated system.

With small angles $\alpha$ and $\beta$, less than 15°, the actual error introduced by ignoring them is minimal, on the order of a few percent at most; on the other hand, the complexity of the computation involved to accommodate them would be quite significant. In many practical applications of an apparatus according to the invention, and in order to keep its manufacturing, installation, and setting up costs as low as possible, it is preferable if the angles $\alpha$ and $\beta$ can be kept small (preferably in the 5° to 10° range, with 15° as a maximum) and their effects neglected. In this way, the scan plane 55 would be virtually likened to the plane x-z. Thus, the outcome of the scanning process will be a set of points which lie on the outline of a cross-section through the object, see also FIG. 7b.

Figure 7B:
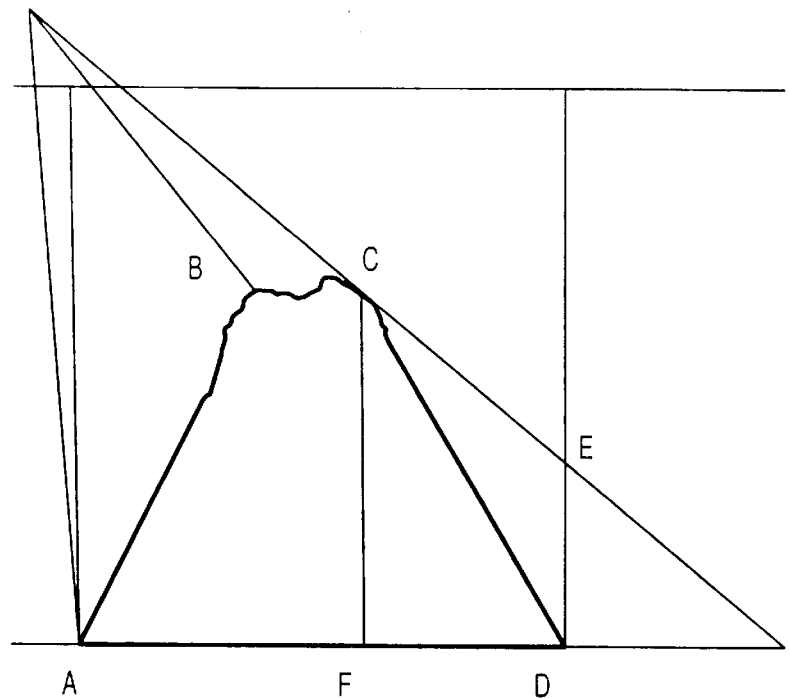
FIG. 7b is a diagram illustrating some aspects of measurement approximation involved in the operation of the apparatus of FIG. 7.

As shown in FIG. 7b, however, with an object having some peculiar cross-section, the information provided by the scan sweep may be inadequate to correctly assess the object outline. In fact, due to the position of the scanner 54, the object may have blanketed regions not spotted by the laser beam, such as the outline portion included between points D and C in the figure. To accommodate such regions in a more realistic fashion, reading by the CCD reader 4 is provided.

In fact, at a given scan sweep by the scanner 54, a corresponding reading is effected with the CCD reader 4 which is offset in time (based upon the information received from the encoder 61) so as to be related to the same portion of the object A as has been scanned. In reading by the CCD reader 4, the overall hamper of the object A at the read line 6, i.e. the segment AD in FIG. 7b, is reckoned. This value would not correspond exactly to the transverse dimension of the cross-section of the object A, due to the angle $\gamma$ being non-zero. However, the errors introduced by neglecting its effect are minor, just as they were mentioned to be in connection with the angles $\alpha$ and $\beta$, so that they are preferably taken into no account in the above instances, and attention is paid to having the angle $\gamma$ small (preferably in the 5° to 10° range, and not larger than 15°). By measuring $\alpha$, $\beta$ and $\gamma$ through appropriate computations, however, exact measurements can be obtained.

The information gathered from the scanning by the scanner 54 and the reading by the CCD reader 4 is processed by the unit 65 to construct a stipulated outline which approaches the true outline of the cross-section with a desired degree of approximation.

In this respect, from FIG. 7b it can be seen that in no case can the true shape of the outline between the points C and D be found, and that different criteria must be applied for the construction of the stipulated outline.

Based on the information supplied by the laser 54 alone, the quadrilateral ABCF would be determined as the stipulated outline, thereby providing an approximation to the nearest value below. On the other hand, by combining with the reading from the CCD reader 4, the segment CD or line CED can be selected between C and D. Selecting the line CD appears to be a statistically more realistic choice if a large number of measurements are considered; however, this choice would fail to tell whether the approximation is to the nearest value below or above for each measurement. By selecting the line CED, we can be assured of an approximation to the nearest value above, even if the absolute error has to be a more significant one.

Notice that, in all cases, for objects which approach a parallelepipedon in shape (as do most of the parcels handled by a distributing station), the segment CD would be substantially vertical and the segment FD would tend to zero. Accordingly, the actual differences between the various types of approximations would almost amount to zero in practice, and the stipulated outline would be virtually coincident with the true one.

Then, after obtaining the stipulated outline at each scan sweep and corresponding reading, the unit 65 will compute its area. Several computation processes may be used for the purpose which provide varying degrees of approximation and are of greater or lesser complexity. A specially convenient computation process is to consider the x and z coordinates of the points on the stipulated outline which have either been reckoned by the scanning (sections ABC) or assumed to the processing according to a comparison of the scanning with the reading (section CD, selected as desired). As previously mentioned, the angles $\alpha$, $\beta$ and $\gamma$ may either be measured and their effect calculated, or be neglected. Thus, the area of the stipulated outline can be computed as the sum of several elementary areas, each having a base equal to the difference in value between the x coordinates of two successive points, and a height equal to a stipulated z coordinate to be selected, for example, equal to one value of the z coordinates of the two points (either the first or the second, or the lowest or the highest, or one selected at random), or to the average therebetween, or an intermediate value.

The area of the stipulated outline is then multiplied by the feed distance (if desired, as multiplied by $\cos\alpha$, if the effect of the angle $\alpha$ is to be accommodated), thereby obtaining an elementary volume. The elementary volume corresponds (with the same degree of approximation as the stipulated outline) to the volume of a portion of the object spanned by two successive scan sweeps and readings.

The above-described steps are repeated at different cross-sections of the object, and a series of elementary volumes stored, while the object A locates within the scan/read zone 58. At a certain moment, the exit detector 60 will signal that the object A has moved out of the scan/read zone 58; thereupon, the processing unit 65 terminates the measuring procedure, adds together all the stored elementary volumes, and issues an approximate measurement of the volume of the object A.

The start and end of the procedure for measuring the volume of an object, as described above, are governed by the movement of the object past the entry detector 59 and the exit detector 60. Alternatively, one or both detectors could be omitted. Their functions would then be served by the processing unit 65 using appropriate software to activate the measurement (i.e., clear the elementary volume count) when a stipulated outline of non-zero area corresponds to a scan sweep and reading, and stop it (i.e., pick up the combined sum of the stored elementary volumes) on the occurrence of a predetermined consecutive number of zero area scan sweeps and readings; this number may be as low as 1, or at any rate be a small number.

Where the measuring procedure is initiated from software, the scanner 54 and CCD reader 4 must be kept operating all the time, even if no measuring procedure is in progress, in order for the arrival of an object to be detected. On the other hand, the provision of an entry detector 59 allows the scanner 54 and CCD reader 4 to be disabled when there are no objects to be measured, and accordingly, despite the added complexity it entails in the apparatus construction, it is preferred wherever a markedly discontinuous inflow of objects for measurement is expected. On the other hand, the presence or absence of an exit detector 60 would not impair the ability to turn off the scanner 54 and CCD reader 4 at the end of a measuring procedure. Therefore, the preference would usually go to the embodiment wherein the end of the measuring procedure is detected by software means.

Advantageously, the apparatus 50 also includes a means of reading an optical code K associated with the object A. The scanner 54, or the CCD reader 4, could itself be used for the purpose in a manner known per se.

In the apparatus described hereinabove, the information about an object A provided by the scanning and reading, i.e. the measurement of its volume and any information to be obtained by reading the optical code K, is preferably recorded in a record of a file stored within the processing unit, so that the file will ultimately contain information covering all the objects that have been moved across the bearing surface. This information can later serve various purposes, e.g. conducting the storehouse premises or loading carriers, printing labels to be attached to the objects, or else.

As relates to reading the optical code K, where the apparatus 10, 30, 50 are operated with a single scanner 14, 34, 54 mounted vertically above the bearing surface 11, 31, 51, optical filters (polarizers) would be suitably included for reading the optical code. In fact, in the vertical arrangement, the scanner would not only pick up scattered light from the illuminated optical code (and containing useful information), but also reflected light which may be fairly strong; without a filter, a dazzling or blinding effect could result to prevent the code from being read.

For improved performance in the matter of optical code reading, it is preferable, however, if the scan plane is set at an angle from the vertical. Therefore, whenever the volume is to be measured using a vertical scanner, one of the embodiments shown in FIG. 2, 3 or 4 will be used of preference, wherein the code reading and volume measurement are provided by different scanners.

Figure 9:
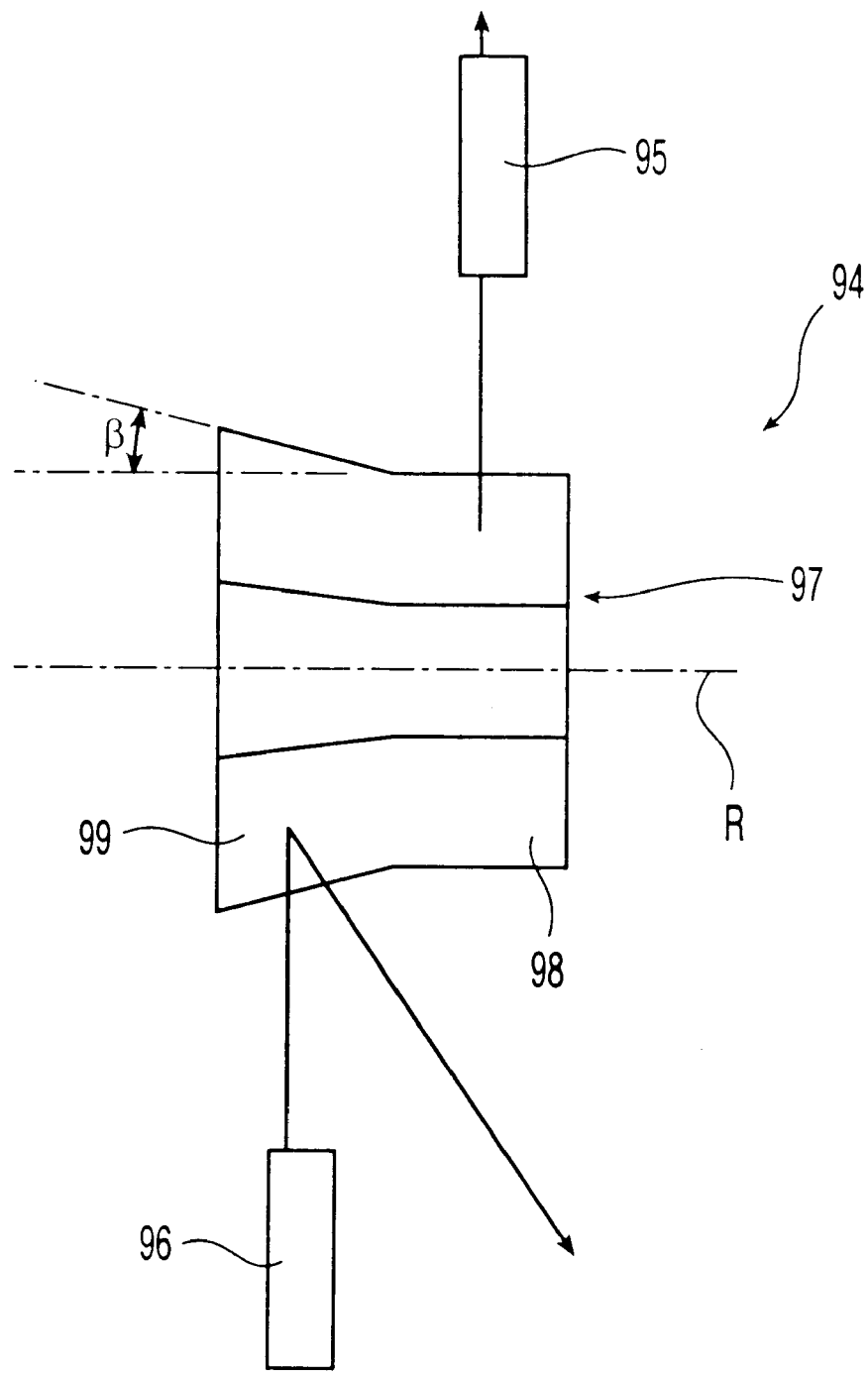
FIG. 9 is a schematic view of a laser unit incorporated to an apparatus according to the invention.

It may be convenient (see FIG. 9) to use a dual scanner 94, that is a scanner having two discrete laser emitters 95 and 96, and a dual rotor 97, with a first portion formed with first mirror faces 98 set at an angle to the axis R of the rotor 97, and a second portion formed with second mirror faces 99 set at a different angle from the first mirror faces 98; for example, the axis R could lie parallel to the bearing surface of the apparatus, the first faces 98 parallel to the axis R, and the second faces 99 set at an angle $\beta$ to the axis R. In this way, the dedicated scan plane for volume measurement can be oriented vertically, and the dedicated scan plane for optical code reading oriented obliquely.

What is claimed is:

1. A process for measuring the volume of an object, comprising the following steps:

placing the object onto a bearing surface;

defining a feed direction for the object on the bearing surface;

defining a scan plane with a laser beam from a scanner that overlies the bearing surface, the scan plane intersecting the plane of the bearing surface along a scan base line which lies transverse to the feed direction;

moving the object across the bearing surface, along the feed direction, relative to the scan plane, until the scan plane will intersect the object;

effecting at least one scan of the object;

measuring the distance of n points of measurement of a top face on the object;

computing the height of the n points of measurement from the bearing surface according to the measured distances;

moving the object across the bearing surface, relative to the scan plane, of a predeterminated feed distance along the feed direction;

repeating the three last steps until the entire object is scanned;

computing the volume according to the height of the n points of measurement from the bearing surface and the predeterminated feed distance along the feed direction.

2. A process according to claim 1, further comprising the following step:

defining a stipulated height as a function of the measured heights of two successive points of measurements;

obtaining the plan position on the bearing surface of the n points of measurements;

defining a stipulated base as a function of the plan positions on the bearing surface of each pair of adjacent points of measurements;

computing a stipulated area element, vertical to the bearing surface, for each pair of adjacent points of measurement, as by multiplying the stipulated base by the stipulated height;

computing a stipulated area as the combined sum of the stipulated area elements computed;

moving the object relative to the scan plane, across the bearing surface, along the feed direction;

defining a stipulated thickness as a function of the feed distance;

computing a volume element by multiplying the stipulated area by the stipulated thickness;

repeating the previous steps until the entire object is scanned;

computing the object volume as the combined sum of all the volume elements.

3. A process according to claim 1, wherein the laser beam is a modulated laser beam.

4. A process according to claim 1, further comprising the following steps:

defining a fixed Cartesian reference system having a longitudinal axis (y) along the feed direction, a transverse axis (x) orthogonal to the longitudinal axis (y) and a vertical axis (z) orthogonal to the plane of the bearing surface;

reckoning and storing a set of triads of coordinates (x, y, z) of n points of measurement of the object swept by the laser beam in the scan plane;

moving the object relative to the scan plane through a feed distance in the feed direction equal to a predetermined longitudinal resolution (L);

repeating the above mentioned steps until the entire object is scanned;

establishing a set of standard values (x") for the transverse coordinate separated by a value equal to a predetermined transverse resolution (T);

constructing, for each scan sweep, a set of equivalent triads (x", y", z") representing equivalent points, wherein the values of the transverse coordinate (x") are equal to the values of the standard set, and the values of the longitudinal coordinate (y") and the vertical coordinate (z") are respectively functions of the values of the reckoned longitudinal and vertical coordinates (y, z);

computing the volume included between the bearing surface (x, y) and the surface defined by those points which have equivalent coordinates (x", y", z").

5. A process according to claim 1, wherein the scan plane is perpendicular with respect to the bearing surface.

6. A process according to claim 1, wherein the scan plane is set at a prefixed angle β from the perpendicular to the plane of the bearing surface.

7. A process according to claim 1, wherein the above mentioned steps are effected by a plurality of laser beams from respective scanners arranged on one or both sides of the bearing surface, the laser beams being each one arranged to act in a respective scan plane.

8. A process according to claim 1, wherein the bearing surface is transparent and comprising the step of effecting at least one scan by another laser beams placed under the bearing surface.

9. A process according to claim 1, further comprising the steps of defining a read plane intersecting the plane of the bearing surface along a read base, laser beams being active in the read plane which are picked up by a CCD reader located above the bearing surface and effecting, for each scan of the scanner, a corresponding scan of reading of the object by means of the CCD reader, each reading being offset in time with respect to the corresponding laser scan by a necessary time period to allow the reading to be affected at the same location on the object where the previous scan was effected.

10. A process according to claim 1, further comprising the step of illuminating by a lamp the scan/read zone in order for the CCD reader to operate its reckoning.

11. A process according to claim 1, wherein the object comprises an optical code associated therewith and further comprising the step of reading the optical code on the object.

12. A process for measuring the volume of an object utilising means of reading an optical code on the object, comprising the following steps:

a) placing the object onto a bearing surface;

b) defining a feed direction for the object on the bearing surface;

c) defining a scan plane with a laser beam from a modulated light scanner overlying the bearing surface and adapted to measure the distance of a spotted point, the scan plane intersecting the plane of the bearing surface along a scan base line which lies transverse to the feed direction;

d) moving the object across the bearing surface, along the feed direction, relative to the scan plane, until the scan plane will intersect the object;

e) obtaining the height, above the bearing surface, of n points of measurement contained in a top face of the object and the scan plane;

f) defining a stipulated height as a function of the measured heights of two successive points of measurement;

g) obtaining the plan position on the bearing surface of the n points of measurement;

h) defining a stipulated base as a function of the plan positions on the bearing surface of each pair of adjacent points of measurement;

i) computing a stipulated area element, vertical to the bearing surface, for each pair of adjacent points of measurement, as by multiplying the stipulated base by the stipulated height;

j) computing a stipulated area as the combined sum of the stipulated area elements computed;

k) moving the object across the bearing surface, along the feed direction, relative to the scan plane, of a predetermined feed distance;

l) defining a stipulated thickness as a function of the feed distance;

m) computing a volume element by multiplying the stipulated area by the stipulated thickness;

n) repeating steps e) to m) above until the entire object is scanned;

o) computing the object volume as the combined sum of all the volume elements.

13. A process for measuring the volume of an object utilising means of reading an optical code on the object, comprising the following steps:

placing the object onto a bearing surface;

defining a feed direction for the object on the bearing surface;

defining a scan plane with a laser beam from a modulated light scanner overlying the bearing surface and adapted to measure the distance of a spotted point, the scan plane intersecting the plane of the bearing surface along a scan base line which lies transverse to the feed direction;

defining a fixed Cartesian reference system having a longitudinal axis (y) along the feed direction, a transverse axis (x) orthogonal to the longitudinal axis (y), and a vertical axis (z) orthogonal to the plane of the bearing surface;

moving the object across the bearing surface, along the feed direction, relative to the scan plane, until the scan plane will intersect the object;

effecting a scan sweep across the object in the scan plane by means of the scanner;

reckoning and storing a set of triads of coordinates (x, y, z) of n points of measurement of the object swept by the laser beam in the scan plane;

moving the object relative to the scan plane through a feed distance in the feed direction equal to a predetermined longitudinal resolution (L);

repeating the three last-mentioned steps until the entire object is scanned;

establishing a set of standard values (x") for the transverse coordinate separated by a value equal to a predetermined transverse resolution (T);

constructing, for each scan sweep, a set of equivalent triads (x", y", z") representing equivalent points, wherein the values of the transverse coordinate (x") are equal to the values of the standard set, and the values of the longitudinal coordinate (y") and the vertical coordinate (z") are respectively functions of the values of the reckoned longitudinal and vertical coordinates (y, z);

computing the volume included between the bearing surface (x, y) and the surface defined by those points which have equivalent coordinates (x", y", z").

14. A process for measuring the volume of an object utilising means of reading an optical code on the object, comprising the following steps:

placing the object onto a bearing surface;

defining a feed direction for the object on the bearing surface;

defining a scan plane with a laser beam from a modulated light scanner overlying the bearing surface and adapted to measure the distance of a spotted point, the scan plane intersecting the plane of the bearing surface along a scan base line which lies transverse to the feed direction;

defining a read plane intersecting the plane of the bearing surface along a read base line which lies transverse to the feed direction, light beams being active in the read plane which are picked up by the CCD reader located above the bearing surface;

moving the object across the bearing surface, along the feed direction, relative to the scan and read planes such that the object will cross these planes;

effecting a series of scan sweeps across the object in the scan plane with the laser beam, such that at each scan sweep, the positions of n points of measurement defining the object outline as spotted by the laser beam are reckoned;

effecting a corresponding series of readings of the object by means of the CCD reader to reckon, at each reading, the maximum width of the object outline as spotted by the CCD reader, each reading being offset in time with respect to the corresponding laser scan sweep by a necessary time period to allow the reading to be effected at the same location on the object where the scan sweep was effected;

processing the information from each scan sweep along with the information from the corresponding reading to define a set of stipulated outlines of the object;

computing the area of each stipulated outline;

computing a feed distance travelled by the object between two successive scan sweeps or between two successive readings;

computing, for each stipulated outline, an elementary volume as the product of the area of the stipulated outline by the feed distance;

computing the volume of the object as the combined sum of the elementary volumes.

15. A process for acquiring dimensional and shape information related to an object, comprising the following step;

placing the object onto a bearing surface;

defining a scan plane with a laser beam from a scanner that overlies the bearing surface, the scan plane intersecting the object along a scan base line;

effecting at least one scan of the object, measuring the distance of n points of measurement of a top face on the object;

computing the height of the n points of measurement from the bearing surface according to the measured distances;

defining a stipulated height as a function of the measured heights of two successive points of measurements;

obtaining the plan position on the bearing surface of the n points of measurements;

defining a stipulated base as a function of the plan positions on the bearing surface of each pair of adjacent points of measurements;

computing a stipulated area element, vertical to the bearing surface, for each pair of adjacent points of measurement, as by multiplying the stipulated base by the stipulated height; and computing a stipulated area as the combined sum of the stipulated area elements computed.

16. A process for acquiring dimensional and shape information related to an object, comprising the following step;

placing the object onto a bearing surface;

defining a scan plane with a laser beam from a scanner that overlies the bearing surface, the scan plane intersecting the object along a scan base line;

effecting at least one scan of the object, measuring the distance of n points of measurement of a top face on the object;

computing the height of the n points of measurement from the bearing surface according to the measured distances;

wherein the scan plane is set at a prefixed angle $\beta$ from the perpendicular to the plane of the bearing surface.

17. A process for acquiring dimensional and shape information related to an object, comprising the following step;
placing the object onto a bearing surface;
defining a scan plane with a laser beam from a scanner that overlies the bearing surface, the scan plane intersecting the object along a scan base line;
effecting at least one scan of the object,
measuring the distance of n points of measurement of a top face on the object;
computing the height of the n points of measurement from the bearing surface according to the measured distances;
wherein the above mentioned steps are effected by a plurality of laser beams from respective scanners that overlie the bearing surface, the laser beams being each one arranged to act in a respective scan plane.

18. A process for acquiring dimensional and shape information related to an object, comprising the following step;
placing the object onto a bearing surface;
defining a scan plane with a laser beam from a scanner that overlies the bearing surface, the scan plane intersecting the object along a scan base line;
effecting at least one scan of the object,
measuring the distance of n points of measurement of a top face on the object;
computing the height of the n points of measurement from the bearing surface according to the measured distances;
wherein the bearing surface is transparent and comprising the step of effecting a scan by another laser beam placed under the bearing surface.

19. A process for acquiring dimensional and shape information related to an object, comprising the following step;
placing the object onto a bearing surface;
defining a scan plane with a laser beam from a scanner that overlies the bearing surface, the scan plane intersecting the object along a scan base line;
effecting at least one scan of the object,
measuring the distance of n points of measurement of a top face on the object;
computing the height of the n points of measurement from the bearing surface according to the measured distances;
further comprising the steps of defining a read plane intersecting the plane of the bearing surface along a read base, at least one laser beam being active in the read plane which is picked up by a CCD reader located above the bearing surface and effecting, for each scan effected by the scanner, a corresponding scan of reading of the object by means of the CCD reader, each reading being offset in time with respect to the corresponding laser scan by a necessary time period to allow the reading to be affected at the same location on the object where the previous scan was effected.

20. An optical apparatus for acquiring information related to an object placed on a bearing surface, comprising:
at least one laser light source;
a deflecting means adapted to effect a plurality of scans of an object in a scan plane;
detecting means adapted to detect the light diffused by the object;
processing means adapted to measure the distance of n points of measurement of a top face on the object and computing the height of the n points of measurement from the bearing surface according to the measured distances, comprising at least two laser scanners.

21. An optical apparatus for acquiring information related to an object placed on a bearing surface, comprising:
at least one laser light source;
a deflecting means adapted to effect a plurality of scans of an object in a scan plane;
detecting means adapted to detect the light diffused by the object;
processing means adapted to measure the distance of n points of measurement of a top face on the object and computing the height of the n points of measurement from the bearing surface according to the measured distances, comprising a CCD reader.

22. An optical apparatus for acquiring information related to an object placed on a bearing surface, comprising:
at least one laser light source;
a deflecting means adapted to effect a plurality of scans of an object in a scan plane;
detecting means adapted to detect the light diffused by the object;
processing means adapted to measure the distance of n points of measurement of a top face on the object and computing the height of the n points of measurement from the bearing surface according to the measured distances, comprising means of reading an optical code associated with the object;
a laser unit including a laser light source and a means of controlling and aiming it;
an analog signal processing unit receiving signals from the laser unit;
an A/D converter receiving, from the analog processing unit, signals related to the distance of the points being spotted by the laser;
a decoder unit receiving, from the analog processing unit, signals related to the optical code;
a processing/storage unit receiving signals from the A/D converter and the decoder unit, wherein the laser unit comprises two laser emitters and a single moving-mirror deflector, the deflector having two discrete sets of mirror surfaces lying at an angle to each other, for the two laser emitters.

23. A process according to claim 19, further comprising the step of illuminating by a lamp the scan/read zone in order for the CCD reader to operate its reckoning.

* * * * *